United States Patent
Ieda et al.

(10) Patent No.: US 6,933,831 B2
(45) Date of Patent: Aug. 23, 2005

(54) DOOR HANDLE FOR VEHICLE

(75) Inventors: Kiyokazu Ieda, Chiryu (JP); Yuichi Murakami, Chiryu (JP); Eiji Mushiake, Aichi-ken (JP); Shinya Ito, Chiryu (JP); Hiroki Okada, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 317 days.

(21) Appl. No.: 10/184,947

(22) Filed: Jul. 1, 2002

(65) Prior Publication Data

US 2003/0001729 A1 Jan. 2, 2003

(30) Foreign Application Priority Data

Jul. 2, 2001 (JP) ........................................ 2001-200627

(51) Int. Cl.[7] .................................................. H04Q 1/00
(52) U.S. Cl. .................. 340/5.72; 340/5.62; 340/426.1; 343/767
(58) Field of Search ............................. 340/5.72, 5.62, 340/426.1; 16/412; 343/767

(56) References Cited

U.S. PATENT DOCUMENTS

| | | | | |
|---|---|---|---|---|
| 3,914,762 A | * | 10/1975 | Klensch ...................... | 340/5.72 |
| 4,760,394 A | * | 7/1988 | Takeuchi et al. ........... | 340/5.62 |
| 5,844,470 A | * | 12/1998 | Garnault et al. ........... | 340/5.62 |
| 6,075,294 A | | 6/2000 | Van den Boom et al. | |
| 6,304,168 B1 | * | 10/2001 | Ohta et al. .................. | 340/5.72 |
| 6,525,646 B1 | * | 2/2003 | Bartz ......................... | 340/5.72 |
| 2002/0152582 A1 | * | 10/2002 | Sueyoshi et al. ............. | 16/412 |

FOREIGN PATENT DOCUMENTS

| | | |
|---|---|---|
| EP | 1 006 028 A2 | 6/2000 |
| JP | 10-208148 A | 11/1998 |
| JP | 10-308149 A | 11/1998 |
| JP | 2000-160897 A | 6/2000 |
| WO | WO 99/19585 A1 | 4/1999 |

* cited by examiner

*Primary Examiner*—Brian Zimmerman
(74) *Attorney, Agent, or Firm*—Burns, Doane, Swecker & Mathis LLP

(57) ABSTRACT

A sensor electrode which detects an approach of a person to a vehicle can be housed in a door handle body for vehicle and is prevented from giving an adverse influence to transmission signals outputted from a transmission antenna. Slits are formed in a bottom portion of the body. The sensor electrode covered with a resin mold is pushed into the inside of the slit.

19 Claims, 7 Drawing Sheets

DOOR HANDLE FOR VEHICLE

FIELD OF THE INVENTION

The present invention relates to a door handle for a vehicle which mounts a sensor electrode for detecting the presence of a person in a door handle of an automobile, and more particularly to a door handle adapted to be used in a vehicle and having a slit in which a sensor electrode is disposed.

DESCRIPTION OF THE RELATED ART

As one of theft prevention (security) systems for a vehicle, there has been proposed a system in which a driver of the vehicle (specified person) carries a portable unit (remote controller) having a function of opening or closing a door and the transmission and the reception of radio wave signals are performed between the portable unit and the vehicle.

In this system, when the system detects that the driver approaches the vehicle, the authentication or identification whether the driver is the authorized driver or not (authentication or identification based on the transmission and the reception of an authentication code) is performed. Then, when it is authenticated that the driver is the authorized driver, a door lock device is operated so as to perform the door unlocking operation.

Examples of such a vehicle theft prevention system are disclosed in Japanese Laid-open Patent Publication No. 308149/1998 and Japanese Laid-open Patent Publication No. 160897/2000.

In the prior art disclosed in the previously-mentioned Japanese Laid-open Patent Publication No. 308149/1998, the system detects the approaching of a driver to a vehicle by a signal based on the change of electrostatic capacitance. This operation is performed by a structure in which a hollow space is formed inside an outside door handle made of synthetic resin and an equilibrium cable for detecting electrostatic capacitance is housed in a hollow portion.

A drawback of this prior art lies in that a sensor electrode (equilibrium cable) is housed in the hollow portion of the resin handle and hence, the capacitance of the sensor electrode is remarkably changed when water enters the hollow portion so that it is difficult to discriminate this change from a change of capacitance which is generated when a person approaches the vehicle. Accordingly, a waterproof structure is indispensable in the system.

Further, since HOT and GND of the sensor electrode is arranged in the inside of the outside handle, the system does not function when the material of the outside door handle is not made of resin material. That is, there arises a fear that the material of the outside door handle is limited.

OBJECT OF THE INVENTION

Accordingly, it is an object of the present invention to provide a door handle for vehicle which can solve the above-mentioned drawbacks of the prior art.

SUMMARY OF THE INVENTION

To solve the above-mentioned drawbacks, the present invention adopts means in which a slit opening at a door-side surface of a door handle body is formed in a door handle body and a sensor electrode covered with a synthetic resin mold is housed in the slit.

Due to such means, it is possible to generate the electrostatic capacitance which can be used as the reference for change of electrostatic capacitance for detecting the presence of a person between the sensor electrode and a door panel. Accordingly, even if a door handle body is formed of metal or material which is produced by applying metal plating on synthetic resin material, the sensor electrode can be used as a sensor for detecting the presence of the person.

Further, since the sensor electrode is arranged in the inside of the slit in a form that the sensor electrode is covered with the synthetic resin, no particular waterproof structure is necessary and an erroneous detection caused by moisture, dust or the like can be eliminated. Further, the sensor electrode is not influenced by material which constitutes the door handle body and hence, the required detection characteristics can be sufficiently ensured.

BRIEF DESCRIPTION OF THE DRAWING FIGURES

DETAILED DESCRIPTION OF THE INVENTION

Preferred embodiments of a door handle for vehicle according to a present invention are explained in detail in conjunction with attached drawings hereinafter.

Figure 1:
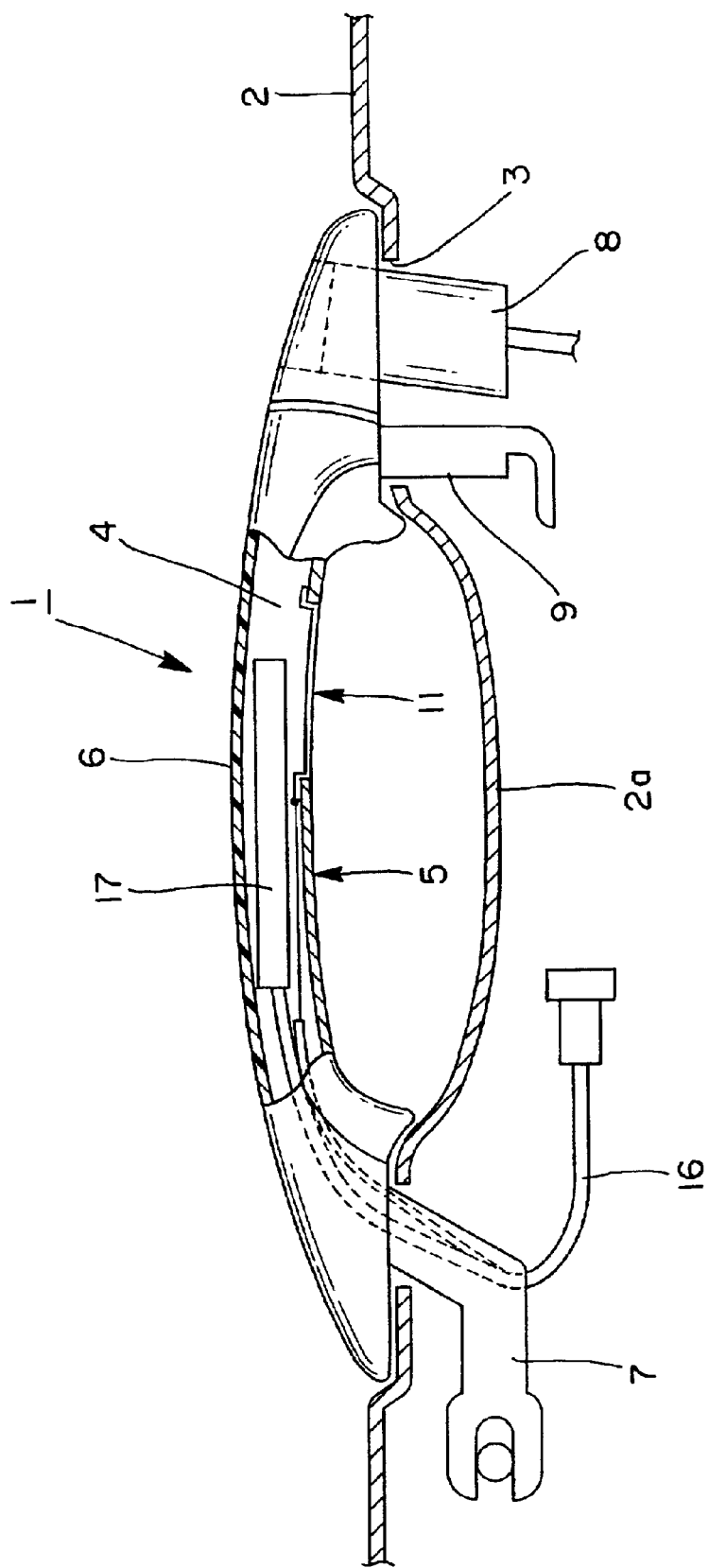
FIG. 1 is a front view of an outside door handle with a part in cross section.

As shown in FIG. 1, an outside door handle 1 is constituted of a metal-made door handle body 5 which is disposed in an opening portion 3 located at a rear side of a door outer panel 2 and having a hollow portion 4 therein and a cover 6 made of synthetic resin which closes the hollow portion 4.

The cover 6 is mounted on the door handle body 5 by snap-fitting a plurality of projections (not shown) which are formed on the cover 6 into holes (not shown) which are formed in the door handle body 5. Further, the cover 6 is fixedly secured to the door handle body 5 using small screws or welding. As such fixing means, usually available fixing means can be used.

The door handle body 5 includes an arm 7 which is extended into the inside of the door outer panel 2 at a front side thereof, while the door handle body 5 is provided with a key cylinder casing 8 and a bell crank body 9 which is cooperatively coupled with a link mechanism (not shown) of a door lock device at a rear side thereof.

The door handle body 5 made of metal assumes a state in which the door handle body 5 is brought into electric contact with the door outer panel 2.

When a driver wants to bring the vehicle door into an opened state, the driver puts his hand into a recessed portion 2a of the outer panel 2 of the vehicle door and grips a grip portion of the outside door handle 1. The driver then rotates the rear portion of the vehicle door toward outside the vehicle about a distal end portion of the arm 7 (in the counterclockwise direction in FIG. 1) thus bringing the vehicle door into the opened state.

On the other hand, when the driver wants to close the vehicle door, the driver pushes the vehicle door in the direction opposite to the opening direction so that the vehicle door is brought into a closed state.

Figure 2:
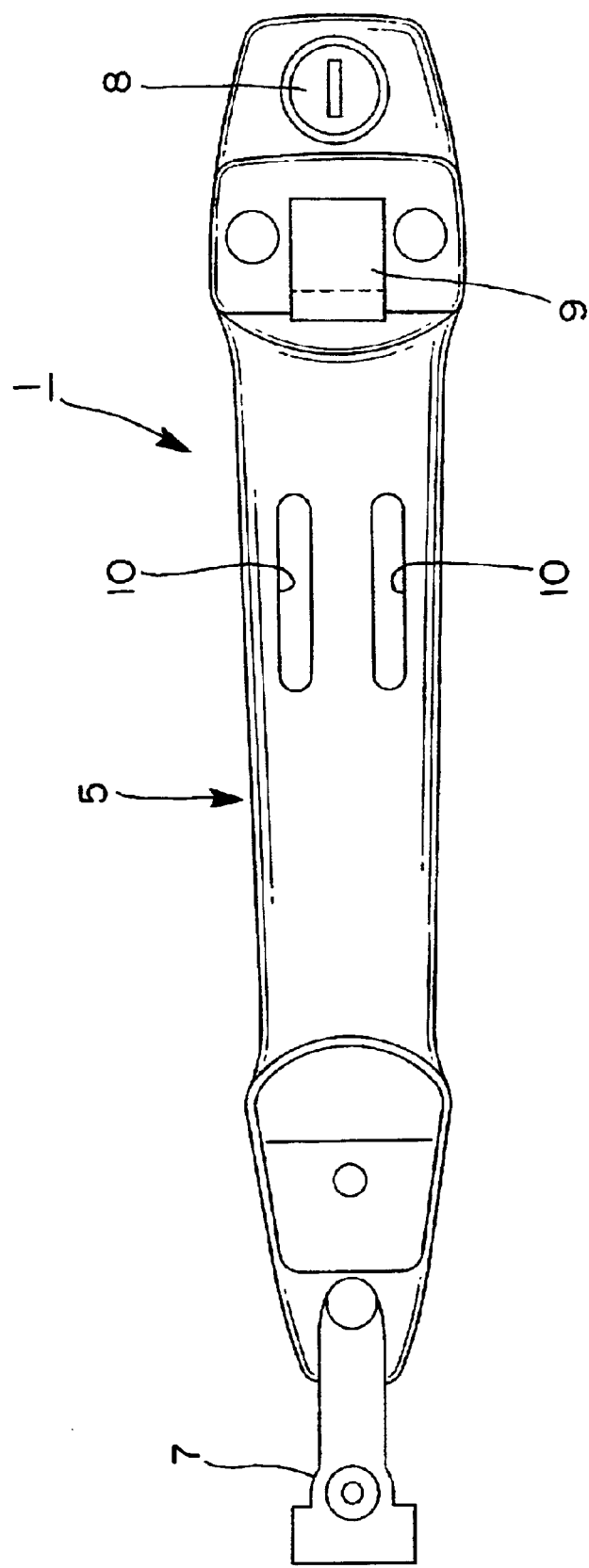
FIG. 2 is a bottom view of the outside door handle.

FIG. 2 is a back view of the door handle body 5 as viewed from the door outer panel 2 side. As shown in FIG. 2, a plurality of slits 10 are preferably formed in a back surface (a surface which faces the door side) of the door handle body 5 at the door outer panel 2 side, wherein the slits 10 are extended in the longitudinal direction. The slits 10 are configured such that the hollow portion 4 of the door handle body 5 is communicated with the outside of the vehicle through the slits 10.

Although two slits 10 are formed in the illustrated example, the number of slits 10 may be three or more. It is preferable to set the width of the slits 10 to equal to or more than 2 mm.

Figure 3:
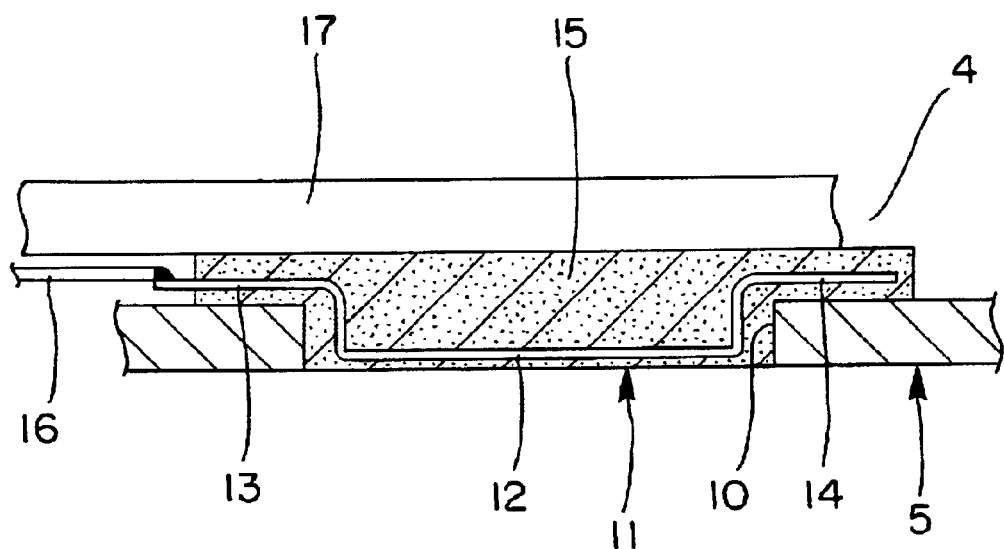
FIG. 3 is a longitudinal cross-sectional view of a slit portion in which a sensor electrode is housed.

As shown in FIG. 3, a sensor electrode 11 which is covered with a synthetic resin mold 15 is arranged in the slits 10.

Since the sensor electrode 11 is covered with the synthetic resin mold 15, there is no possibility that foreign materials such as raindrops, dust or the like directly adhere to the sensor electrode 11. Accordingly, there is no change of electric capacitance which may be generated by adhesion of foreign materials.

In the illustrated example, the width of the sensor electrode 11 is set to 1 mm and the width of the slit 10 is set to 2 mm.

The sensor electrode 11 is comprised of a U-shaped portion 12 which is positioned in the inside of the slit 10 and is opened upwardly and front and rear horizontal portions 13, 14 which are extended from both ends of the U-shaped portion 12 in the frontward and backward directions in the hollow portion 4. Distal end portions of the front and rear horizontal portions 13 are extended over the resin mold 15 and are welded to harnesses 16 by soldering. The resin mold 15 is constituted of a portion disposed in the slit 10 and portions which are extended along an inner surface of the door handle body 5.

The resin mold 15 having the sensor electrode 11 in the inside thereof may be pushed into the slit 10. Alternatively, in a state that the sensor electrode 11 is disposed in the inside of the slit 10, resin is filled in the slit 10 by injection molding thus forming the resin mold 15 in the slit 10.

A radio wave transmission antenna 17 which transmits signals to a person who performs an open/close manipulation of the door is arranged in the inside of the hollow portion 4 (see FIG. 1 and FIG. 3). In the illustrated drawing, the transmission antenna 17 and the harness 16 of the sensor electrode 11 are collectively arranged.

To support the transmission antenna 17 on the door handle body 5, usually available means such as caulking, screws or the like is used. Since the sensor electrode 11 is arranged at a back surface of the transmission antenna 17 which is irrelevant to a radio wave direction (vehicle-side direction) from the transmission antenna 17, there is no possibility that the sensor electrode 11 adversely affects output signals from the transmission antenna 17.

As can be understood from FIG. 3, a major portion of the sensor electrode 11 is mounted in the inside of a portion of the door handle body 5 corresponding to a plate thickness which is usually used. Accordingly, to put the present invention into practice, it is unnecessary to increase the thickness of the door handle body 5.

Figure 4:
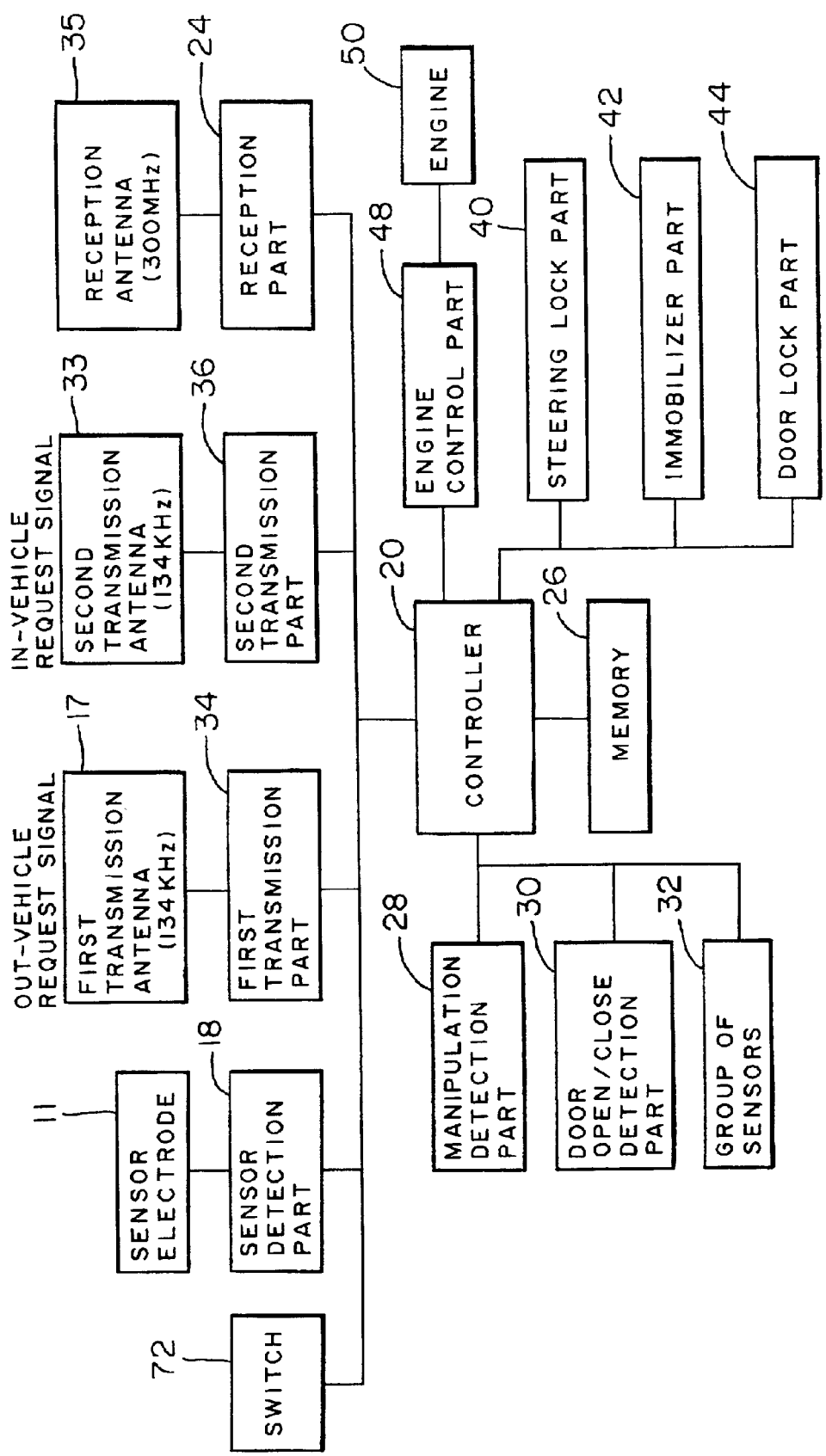
FIG. 4 is a block diagram showing one example of a keyless entry system of a vehicle.

FIG. 4 shows a system block diagram when a keyless entry system (that is, a vehicle theft prevention (security) system) is applied to a door open/close device, wherein the keyless entry system enables locking (unlocking) of a vehicle door without using a vehicle key when a driver (an authorized person) has a portable unit called a remote controller and approaches or moves away from the vehicle.

In this system, the vehicle is provided with two out-vehicle/in-vehicle antennas consisting of a first transmission antenna 17 and a second transmission antenna 33 for performing the communication with the outside of the vehicle, wherein the first transmission antenna 17 is arranged in the outside door handle 1 mounted on the vehicle door outside the vehicle and the second transmission antenna 33 is disposed in an instrument panel disposed in the inside of a vehicle room.

Further, the first transmission antenna 17 is connected to a first transmission part 34, the second transmission antenna 33 is connected to a second transmission part 36, and both transmission parts 34, 36 are respectively connected to a controller 20 which is in charge of the control of the vehicle.

Further, the sensor electrode 11 which detects a person approaching the vehicle door and a sensor detection part 18 which detects a person based on information from the sensor electrode 11 are connected to the controller 20. The sensor electrode 11 is disposed in the inside of the outside door handle 1.

The controller 20 transmits a first request signal (out-vehicle request signal) and a second request signal (in-vehicle request signal) respectively to the first transmission part 34 and the second transmission part 36.

These signals are modulated and the request signals of 134 kHz, for example, are transmitted from the first transmission antenna 17 and the second transmission antenna 33 to a portable unit 60 which a driver carries at the time of riding on the vehicle as the out-vehicle request signal and the in-vehicle request signal.

Further, the vehicle is provided with a reception antenna 35. The reception antenna 35 receives signals outputted from the portable unit 60. For example, signals of 300 MHz are transmitted to the reception part 24 and are inputted to the controller 20 after being demodulated.

The controller 20 has a function of storing codes such as a first code for performing door locking, a second code for performing starting of an engine, an ID code of a transponder and the like in the inside of a memory 26 even when the supply of electricity is interrupted.

A manipulation detection part 28 which is connected to the controller 20 detects switching manipulations such as ignition, while a door open/close detection part 30 which is represented by a courtesy SW or the like detects an open/close operation of the door. A group of sensors 32 detect a vehicle speed and an open/close state of windows using various sensors.

Further, a steering lock part 40 which is capable of mechanically locking and inhibiting the steering manipulation, an immobilizer part 42 which inhibits the supply of fuel to an engine or inhibits an ignition operation at the time of an unfair use, and a door lock part 44 which is represented by a door lock device for setting all doors to a locked state or an unlocked state are connected to the controller 20.

Further, an engine control part 48 which performs an engine control of an engine 50 of the vehicle is connected to the controller 20.

Figure 5:
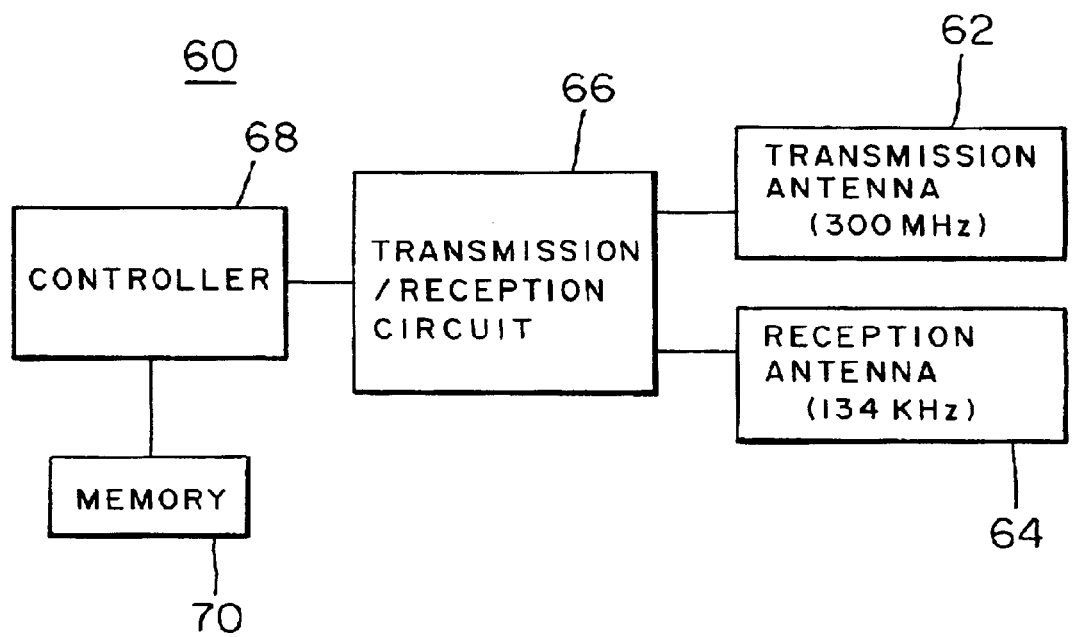
FIG. 5 is a block diagram of a portable unit for the system shown in FIG. 4.

FIG. 5 is a block diagram showing the portable unit 60 of the system. The portable unit 60 includes a transmission antenna 62 which transmits signals to the vehicle at 300 MHz and a reception antenna 64 which receives the ID request signals of 134 kHz transmitted from the vehicle. The transmission antenna 62 and the reception antenna 64 are connected to a transmission/reception circuit 66 which is connected to a controller 68.

When the reception antenna 64 receives the request signal (out-vehicle request signal) of 134 kHz from a vehicle-mounted unit, the signal is demodulated by the transmission/reception circuit 66 and is inputted to the controller 68. The controller 68 transmits the first code and the second code stored in the inside of the memory 70 to the transmission/reception circuit 66. The transmission/reception circuit 66 modulates the request signal and transmits the signal of 300 MHz, for example, to the vehicle-mounted unit of the vehicle from the transmission antenna 62.

From the first transmission antenna 17 and the second transmission antenna 33 which constitute the vehicle-mounted units, the request signals of the frequency 134 kHz, for example, are transmitted to the portable unit 60. When the portable unit 60 which the driver carries receives such a request signal, signals of the frequency 300 MHz which are obtained by modulating the first and the second codes in response to the received signals are returned as acknowledgement signals.

The reception antenna 35 is mounted on an inner mirror disposed in the inside of the vehicle and the signals of frequency 300 MHz received by the reception antenna 35 are demodulated by the reception circuit 24 and are inputted to the controller 20 so that the controller 20 can receive the first and the second codes.

This system is configured to detect the approach of a person carrying the portable unit 60 to the vehicle door using the sensor electrode 11 mounted in the inside of the outside door handle 1. That is, when the driver or the person opens the vehicle door 3 to make the vehicle door assume the opened state, the electrostatic capacitance is changed due to the operation of the driver to grip the grip portion of the outside door handle 1 (approach of a hand). Accordingly, it is possible to detect that the person is present or the person is about to get on the vehicle in response to the change of the electrostatic capacitance.

When the person approaches the vehicle door so as to bring the vehicle door into the opened state, the person extends his hand to the grip portion of the outside door handle 1 and grips the grip portion of the outside door handle 1, pulls the grip portion outside the vehicle so as to operate the outside door handle 1 in the opening direction thus performing the operation to set the vehicle door at the opened state.

Here, by setting a line connected to the sensor electrode 11 at a given oscillation level, that is, in the oscillation state in which the oscillation level is held by an external oscillation circuit, a total electrostatic capacitance C consisting of electrostatic capacitance generated between the outside door handle 1 and the sensor electrode 11 and electrostatic capacitance generated between an infinite extension line with respect to the sensor electrode 11 and the sensor electrode 11 is fluctuated or changed from the state in which a given oscillation is performed (oscillation level) when the person's hand approaches the sensor electrode 11 and the hand grips the grip portion.

In this manner, when the hand approaches the sensor electrode 11 and grips the grip portion, the oscillation level is fluctuated (to high level or low level). Accordingly, in the sensor detection part 18, with respect to the value of the oscillation level which performs the detection that the person is recognized, by presetting a threshold level or by setting the threshold level such that the threshold level is changed in response to the situation, when the oscillation level becomes equal to or more than the threshold level or equal to or less than the threshold level, for example, the determination of the presence of person which sufficiently takes the will of the person who is going to open the vehicle door into account can be realized so that the detection accuracy of the sensor as a person detection sensor can be enhanced.

In this manner, when the door opening operation by the person is detected, the controller 20 gives a door lock release signal to the door lock part 44 in a state that the door is unlocked so that it is possible to automatically unlock the vehicle door 3 without performing the lock/unlocking manipulation using the vehicle key.

Figure 6:
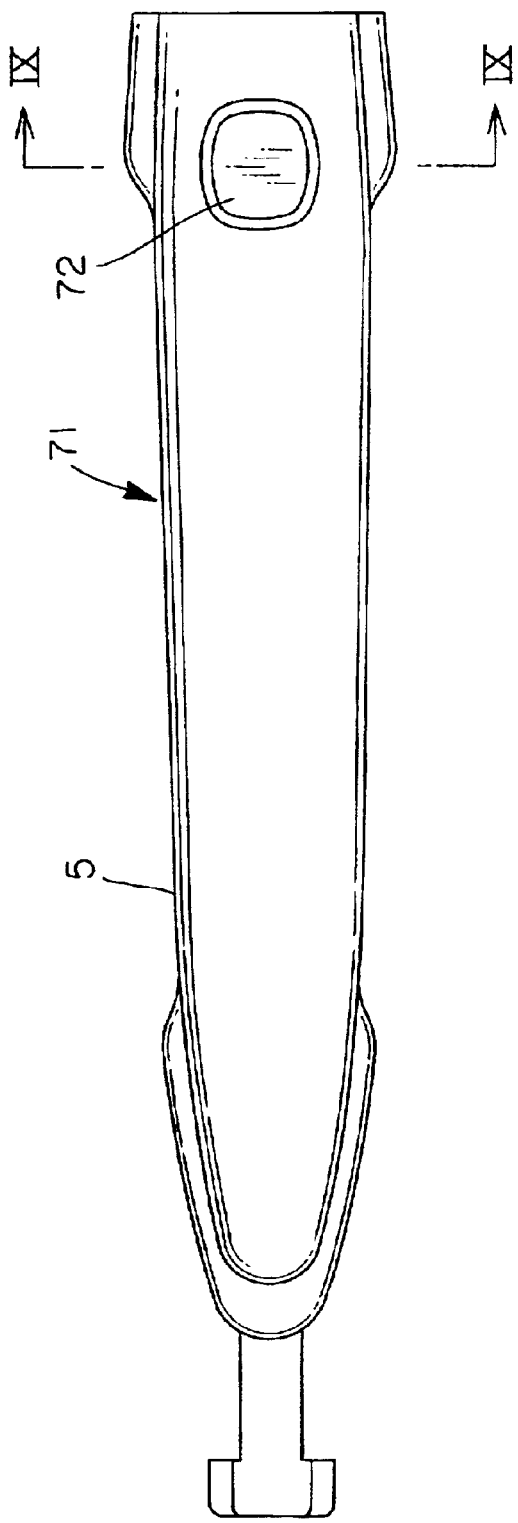
FIG. 6 is a front view of an outside door handle according to a second embodiment of the present invention.
Figure 7:
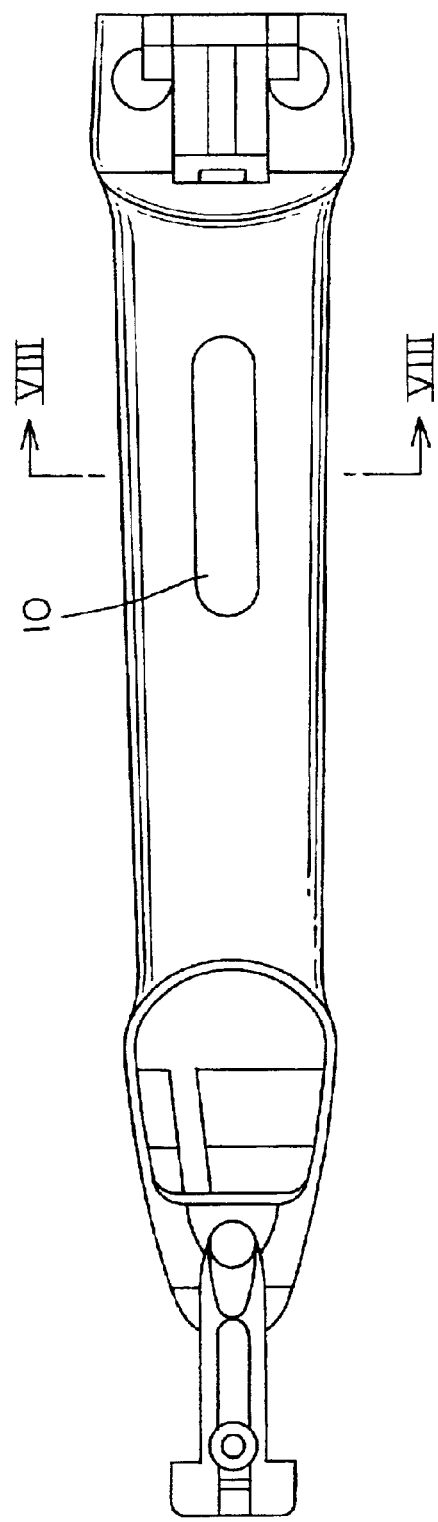
FIG. 7 is a bottom view of the outside door handle.
Figure 8:
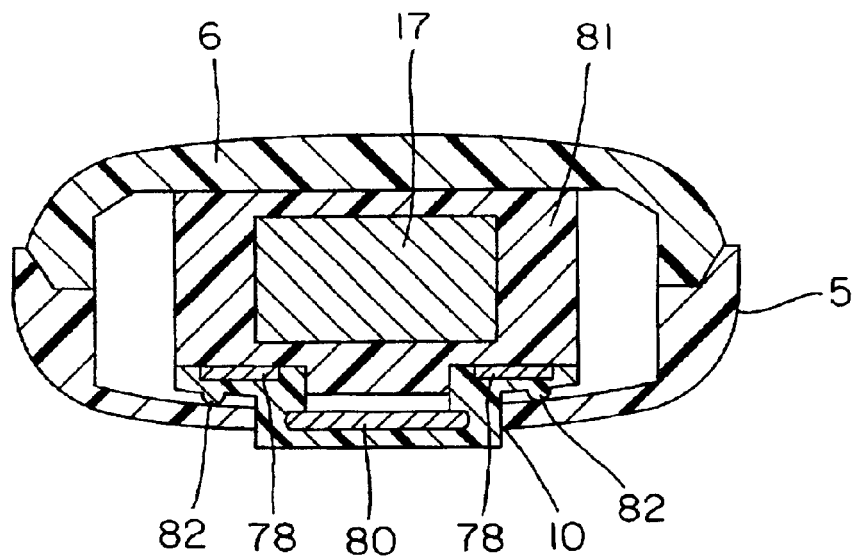
FIG. 8 is a cross-section taken along a line VIII—VIII in FIG. 7.
Figure 9:
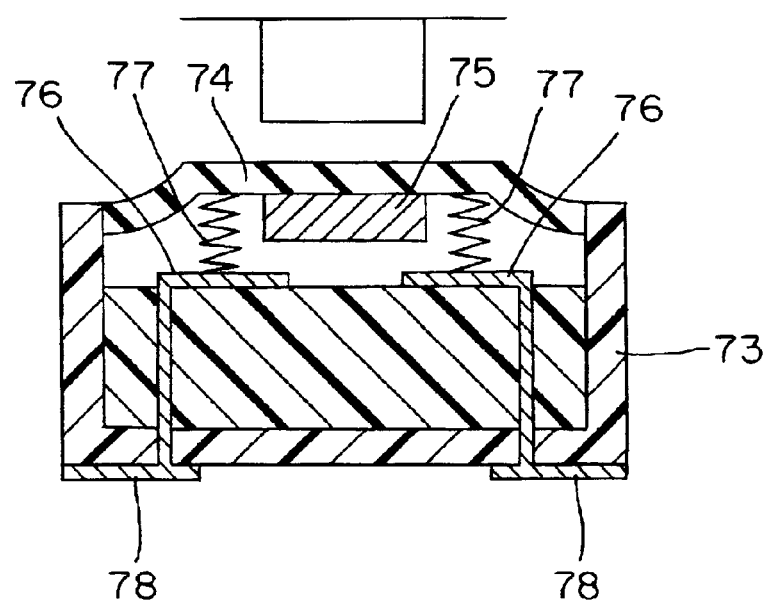
FIG. 9 is a cross-section taken along a line IX—IX in FIG. 6.

A second embodiment of a door handle 71 according to the present invention is illustrated in FIGS. 6–9. As shown in FIG. 6, the door handle cover 6 is provided at its outer surface with a door lock switch 72 which has a conventional structure as shown in FIG. 9. The switch 72 has a switch body 73 made of a synthetic resin material and a cover 74 made of a rubber material. A switch mechanism having a moving electric contact 75, stationary opposed electric contacts 76, 76 and springs 77, 77 to urge the cover 74 in one direction is housed in the body 73. When the driver who caries the portable unit 60 stands outside the vehicle and pushes or operates the door lock switch 72, a signal from the switch 72 is transmitted through a wire 78 and the controller 20 (see FIG. 5) to the door lock part 44 (see FIG. 5) so as to make the door at the lock state.

The door lock body 5 is provided with a single slit 10 into which the sensor electrode 11 sealed by a mold member 79 is fitted (see FIG. 8). The mold member 79 is composed of a resin base member 80 in which the sensor electrode 11 is housed and a synthetic resin mold part 81 in which the transmission antenna 17 is molded. The electric wire 78 extending from the door lock switch 72 runs between the mold part 81 and the resin base member 80.

The resin base member 80 is provided with a projection 82 which is formed along the slit 10 and brought into seal contact with the inside of the door handle body 5 when the mold member 79 is fitted into the slit 10 to ensure a water-proof structure.

The door open/close operation of the second embodiment is the same as that of the first embodiment and hence the description thereof will be omitted.

As can be understood from the illustrated embodiment, the sensor electrode 11 is covered with the resin mold 15 and the major portion of the sensor electrode 11 is housed in the inside of the slit 10 of the door handle body 5. Accordingly, no particular seal means is necessary. Further, no particular separate space for accommodating the sensor electrode 11 is necessary.

With respect to the number of the slits 10, provided that the slit causes no problem on the mechanical strength of the outside door handle 1, one slit 10 for one large sensor electrode 11 is sufficient. By adopting a plurality of slits 10, the outside door handle 1 can be reversed upside down. Particularly, by arranging two slits 10 symmetrically with respect to the longitudinal center axis of the outside door handle 1, the detection of person can be performed using the sensor electrode 11 at a fixed detection sensitivity irrespective of the manner of gripping the grip portion by the person.

Since the sensor electrode 11 is disposed at the back of the transmission antenna 17, there is no fear that the transmission output from the transmission antenna 17 is reduced.

What is claimed is:

1. A door handle for vehicles, comprising a door handle body and a sensor electrode in the door handle body for detecting the presence of a person, the handle body comprising at least one slit which is opened in a door-side surface thereof, and the sensor electrode covered with a synthetic resin mold is housed in the slit;

wherein the door handle body is formed of metal material.

2. A door handle for vehicles according to claim 1, wherein the door handle body includes a hollow portion which is closed by a cover, the slit is opened at the hollow portion, and the sensor electrode is electrically connected with a harness in the inside of the hollow portion.

3. A door handle for vehicles according to claim 2, wherein a transmission antenna which outputs signals to the outside of the vehicle is disposed in the hollow portion of the door handle body.

4. A door handle for vehicles according to claim 3, wherein a plurality of slits are arranged symmetrically in the widthwise direction with respect to a center axis extending along a longitudinal direction of the door handle body.

5. A door handle for vehicles according to claim 4, wherein the sensor electrode has a U-shaped portion in cross-section.

6. A door handle for vehicles according to claim 2, wherein a transmission antenna which outputs signals to the outside of the vehicle is embedded in a resin mold part of the synthetic resin mold in the hollow portion.

7. A door handle for vehicles according to claim 6, wherein the sensor electrode is supported on a base member which is integral and covered with the resin mold part and has an annular projection, the annular projection being brought into water-seal contact with the inside of the door handle body when the base member is fitted into the slit.

8. A door handle for vehicles according to claim 3, wherein the sensor electrode is disposed at a door side of the antenna.

9. A door handle for vehicles, comprising a door handle body and a sensor electrode in the door handle body for detecting the presence of a person, the handle body comprising at least one slit which is opened in a door-side surface thereof, and the sensor electrode covered with a synthetic resin mold is housed in the slit;

the door handle body includes a hollow portion which is closed by a cover, the slit is opened at the hollow portion, and the sensor electrode is electrically connected with a harness in the inside of the hollow portion;

a transmission antenna which outputs signals to the outside of the vehicle is embedded in a resin mold part of the synthetic resin mold in the hollow portion; and the sensor electrode is supported on a base member which is integral and covered with the resin mold part and has an annular projection, the annular projection being brought into water-seal contact with the inside of the door handle body when the base member is fitted into the slit.

10. A door handle for vehicles according to claim 9, wherein a transmission antenna which outputs signals to the outside of the vehicle is disposed in the hollow portion of the door handle body.

11. A door handle for vehicles according to claim 10, wherein the sensor electrode is disposed at a door side of the antenna.

12. A door handle for vehicles according to claim 10, wherein a plurality of slits are arranged symmetrically in the widthwise direction with respect to a center axis extending along a longitudinal direction of the door handle body.

13. A door handle for vehicles according to claim 12, wherein the sensor electrode has a U-shaped portion in cross-section.

14. A door handle for vehicles according to claim 9, wherein the door handle body is formed of metal material.

15. A door handle for vehicles, comprising a door handle body and a sensor electrode in the door handle body for detecting the presence of a person, the handle body comprising at least one slit which is opened in a door-side surface thereof, and the sensor electrode covered with a synthetic resin mold is housed in the slit;

the door handle body includes a hollow portion which is closed by a cover, the slit is opened at the hollow portion, and the sensor electrode is electrically connected with a harness in the inside of the hollow portion;

a transmission antenna which outputs signals to the outside of the vehicle is disposed in the hollow portion of the door handle body;

a plurality of slits are arranged symmetrically in the widthwise direction with respect to a center axis extending along a longitudinal direction of the door handle body; and the sensor electrode has a U-shaped portion in cross-section.

16. A door handle for vehicles according to claim 15, wherein the sensor electrode is disposed at a door side of the antenna.

17. A door handle for vehicles according to claim 15, wherein a transmission antenna which outputs signals to the outside of the vehicle is embedded in a resin mold part of the synthetic resin mold in the hollow portion.

18. A door handle for vehicles according to claim 17, wherein the sensor electrode is supported on a base member which is integral and covered with the resin mold part and has an annular projection, the annular projection being brought into water-seal contact with the inside of the door handle body when the base member is fitted into the slit.

19. A door handle for vehicles according to claim 15, wherein the door handle body is formed of metal material.

* * * * *